United States Patent
Chen et al.

(10) Patent No.: US 10,417,228 B2
(45) Date of Patent: Sep. 17, 2019

(54) APPARATUS AND METHOD FOR ANALYTICAL OPTIMIZATION THROUGH COMPUTATIONAL PUSHDOWN

(71) Applicant: General Electric Company, Schenectady, NY (US)

(72) Inventors: Qian Chen, San Ramon, CA (US); Vamshi Gandrapu, San Ramon, CA (US)

(73) Assignee: General Electric Company, Schenectady, NY (US)

(*) Notice: Subject to any disclaimer, the term of this patent is extended or adjusted under 35 U.S.C. 154(b) by 353 days.

(21) Appl. No.: 15/381,559

(22) Filed: Dec. 16, 2016

(65) Prior Publication Data
US 2018/0173757 A1   Jun. 21, 2018

(51) Int. Cl.
*G06F 16/2453*   (2019.01)
*G06F 9/50*   (2006.01)

(52) U.S. Cl.
CPC ...... *G06F 16/24542* (2019.01); *G06F 9/5066* (2013.01)

(58) Field of Classification Search
CPC combination set(s) only.
See application file for complete search history.

(56) References Cited

U.S. PATENT DOCUMENTS

| 7,908,313 | B2 * | 3/2011 | Lurie | G06F 9/5072 709/202 |
| 9,858,384 | B2 * | 1/2018 | Rooyen | H01L 21/76886 |
| 2014/0026111 | A1 * | 1/2014 | Stitt | G06F 9/4484 717/101 |

* cited by examiner

*Primary Examiner* — Shyue Jiunn Hwa
(74) *Attorney, Agent, or Firm* — Fitch, Even, Tabin & Flannery LLP

(57) ABSTRACT

An analytic is deployed at the task driver, and the analytic performs one or more functions. At the task driver, an execution plan for the analytic is determined based at least in part upon an analysis of the functions. The execution plan determines a location for execution of each of the functions, and the location is one of the computational node or the data node. The functions are executed according to the execution plan.

14 Claims, 4 Drawing Sheets

APPARATUS AND METHOD FOR ANALYTICAL OPTIMIZATION THROUGH COMPUTATIONAL PUSHDOWN

BACKGROUND OF THE INVENTION

Field of the Invention

The subject matter disclosed herein generally relates to analytics, and, more specifically, to optimizing the performance of these analytics.

Brief Description of the Related Art

Various types of industrial machines are used to perform various manufacturing operations and tasks. For instance, some machines are used to create and finish parts associated with wind turbines. Other machines are used to create mechanical parts or components utilized by vehicles. Still other machines are used to produce electrical parts (e.g., resistors, capacitors, and inductors to mention a few examples). Typically, industrial machines are controlled at least in part by computer code (or a computer program) that is executed by a processor that is located at the machine.

Industrial machines have sensors or other types of measurement devices that gather data, for example, concerning the operation of the machine. Analytics are computer programs that in some aspects analyze the data produced by the sensors at the industrial machines. In these regards, analytics can perform various types of analysis on the data, and can present the results of the analysis to a user or operator.

Analytics are deployed in various locations. At these locations, the analytics need to communicate with different data sources such as Time Series streaming, Asset, distributed file systems, distributed databases, relational databases, web services, real-time streaming data, and so on at different locations. Because the data sources may not be at the same location of the analytic, the data needs to pass through various network elements to be used by the analytic. This can significantly slow operation of the system.

Previous attempts to address these problems have been made, but unfortunately, have not been successful.

BRIEF DESCRIPTION OF THE INVENTION

The present invention is directed to optimizing analytic performance without changing analytic implementation by selectively pushing analytic operation down to data sources to run computations natively (locally, at the data source) and close to the data storage or data nodes. This intelligent push-down minimizes intermediate cross-system data transfer, and maximizes the opportunity of computation with data locality.

In some of these embodiments, a system that is configured to efficiently execute an analytic includes a computation cluster, an analytic, and a data cluster. The computation cluster includes at least one computational node and a task driver. The analytic is deployed at the task driver and performs one or more functions. The data cluster includes at least one data node, and the computation cluster is remotely located from the data cluster.

The task driver is configured to determine an execution plan for the analytic based at least in part upon an analysis of the functions. The execution plan determines a location for execution of each of the functions, the location being one of the computational node or the data node. The functions are executed according to the execution plan.

In aspects, the computational node and the data node include a processor. In examples, some of the functions are executed by sending one or more queries to the data cluster. In other examples, the data cluster includes a router.

In other aspects, some of the functions are executed at the computation node creating first results, and others of the functions are executed at the data node creating second results. In examples, the first results and the second results are aggregated by the task driver.

In others of these embodiments, approaches for efficiently executing an analytic are provided. Portions of the analytic are executed at a computation cluster that includes at least one computational node and a task driver, and a data cluster that includes at least one data node. The computation cluster is remotely located from the data cluster.

An analytic is deployed at the task driver, and the analytic performs one or more functions. At the task driver, an execution plan for the analytic is determined based at least in part upon an analysis of the functions. The execution plan determines a location for execution of each of the functions, and the location is one of the computational node or the data node. The functions are executed according to the execution plan.

In aspects, the computational node and the data node include a processor. In examples, some of the functions are executed by sending one or more queries to the data cluster. In other examples, the data cluster includes a router.

In still other aspects, some of the functions are executed at the computation node creating first results and others of the functions are executed at the data node creating second results. In other examples, the first results and the second results are aggregated by the task driver.

BRIEF DESCRIPTION OF THE DRAWINGS

For a more complete understanding of the disclosure, reference should be made to the following detailed description and accompanying drawings wherein.

Figure 1:
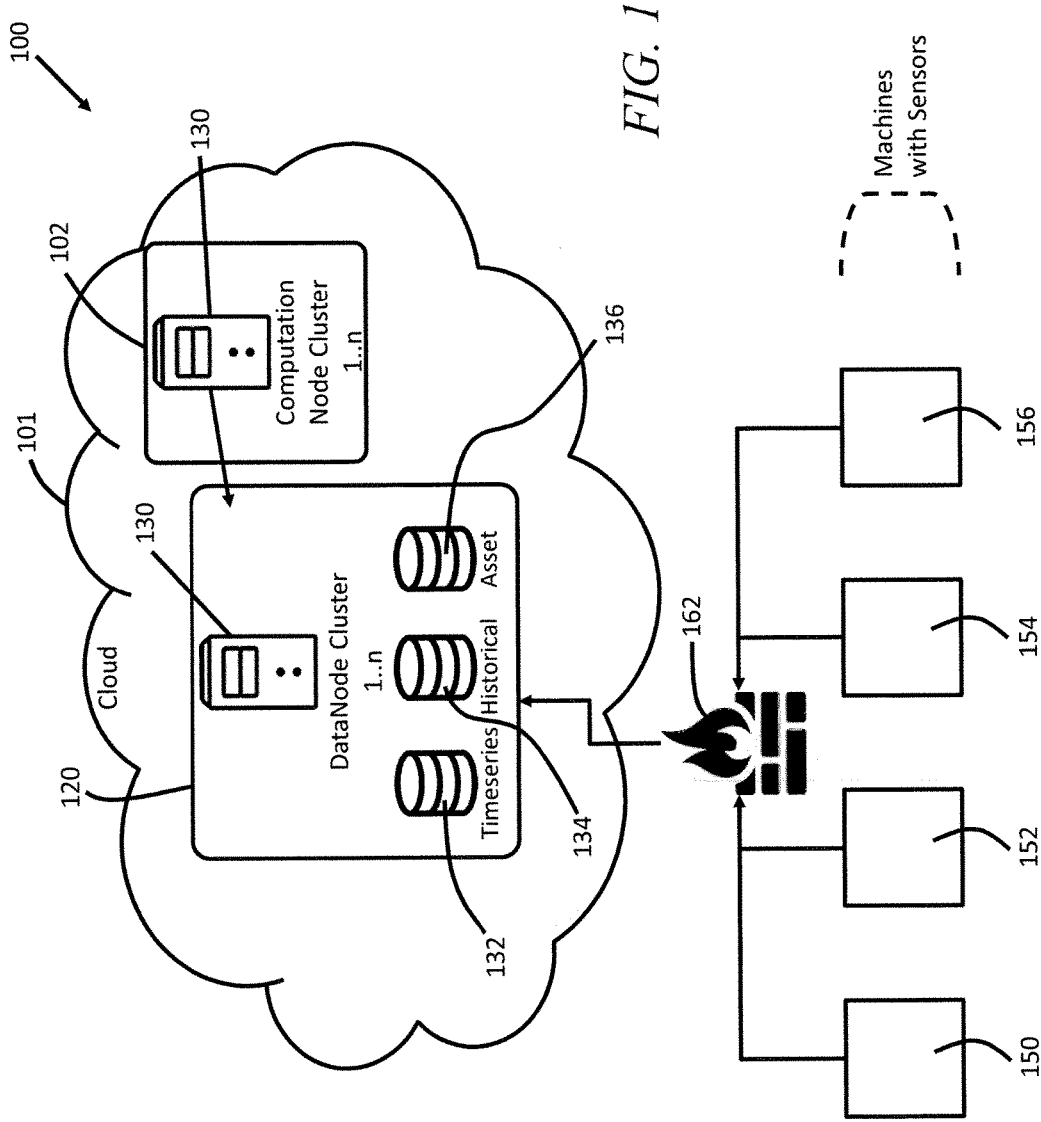
FIG. 1 comprises a block diagram of a system that intelligently executes analytic functions at different locations according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

The present approaches advantageously optimize analytic performance without changing analytic implementation by selectively pushing analytic operation down to data sources to run computations natively, and close to the data storage or data nodes. This intelligent push-down minimizes intermediate cross-system data transfer and maximizes the opportunity of computation with data locality.

In examples, a data cluster may include data nodes and a resource manager. A computation cluster may include computation nodes. Each of the nodes (data or computation) include a processor, and possibly memory or other data storage device. An analytic that may have various computations is executed at a computation node at the computation cluster. This causes one or more queries to be sent to the data cluster. A router at the data cluster receives the query and routes it to one or more data nodes in the data cluster. The data nodes perform a computation producing results. The results are aggregated by a resource manager at the data cluster. The aggregated result is sent back to the computation node in answer to the query.

The present approaches advantageously reduce network data traffic. Since there is no need to copy vast amounts of data across networks by leveraging on the software features available on data nodes through co-location, operation of the entire system is faster.

In the present approaches, Operations Optimization (OO) key performance indicator (KPI) analytics interact with various data sources and runs computation against these resources. KPIs access data through data-source-neutral OO data I/O APIs, which significantly simplifies KPI implementation and decouples resource access mechanism from analytic algorithm implementation. A wide variety of data sources are supported via plug-and-play model, such as Time Series streaming, Asset, distributed file systems, distributed databases, relational databases, web services, real-time streaming data, and so forth. SQL-like and UDF can be used in analytic implementation. Previously, performance became a challenge when analytic computation ran against a mix of data from different sources with different underlying protocols. To optimize analytic performance without changing analytic implementation, OO runtime intelligently pushes data operations through OO data I/O framework down to data sources to run computation natively and close to the data storage or data nodes. The intelligent computation push-down minimizes intermediate cross-system data transfer and maximizes the opportunity of computation with data locality.

Referring now to FIG. 1, one example of a system 100 that intelligently executes analytic functions at different locations is described. The cloud 101 includes a computation cluster 102 (including a task driver), and a data cluster 120. The cloud 120 is a network that may include gateways, routers, processors, and data stores. The cloud is accessible to a wide variety of users.

Each of the computation cluster 102 and the data cluster 120 include individual nodes. Each of the nodes may include a processor 130 and data stores. The data cluster 120 includes the processor 130, and may also include a time series data store 132 (storing time series data from machines 150, 152, 154, and 156), a historical data store (storing data from previous time periods, e.g., selected time series data from the past), and an asset data store 136 (e.g., store blueprint or asset model information such as the operating speeds, voltages, pressures, layouts (or other characteristics) of the machines 150, 152, 154, and 156). The computation cluster 102 includes the processor 130, but (in this example) no data stores. Although one data cluster and one computation cluster are shown in FIG. 1 (for purposes of simplicity), it will be understood than 1-to-n data clusters, and 1-to-n computation clusters may exist, where n is an integer.

The machines 150, 152, 154, and 156 can be any type of industrial machine. For example, the machines 150, 152, 154, and 156 can be used to create and finish parts associated with wind turbines. Other examples are machines used to create mechanical parts or components utilized by vehicles. Still other machines are used to produce electrical parts (e.g., resistors, capacitors, and inductors to mention a few examples).

The machines 150, 152, 154, and 156 transmit information through firewall 162 to the cloud 101. Firewall 162 may be located in another network that is coupled to the cloud and the machines 150, 152, 154, and 156. The information may be time series data (e.g., data that is time stamped and organized according to time). The information may be sensed data from sensors on the machines 150, 152, 154, and 156. In examples, the information may be pressure, temperature, voltage, or speed information to mention a few examples.

The computation cluster 102 includes a task driver that is executed at its processor 130. An analytic is deployed at the task driver and performs one or more functions. As mentioned, an analytic is a computer program that executes or performs various functions to obtain a result. For example, an analytic may determine the efficiency or condition of the machines 150, 152, 154, and 156.

The task driver is configured to determine an execution plan for the analytic (and, more specifically, the functions that comprise the analytic) based at least in part upon an analysis of the functions and the requirements of the individual functions that comprise the analytic. The execution plan determines a location for execution of each of the functions, the location being one of the computation cluster 102 or the data cluster 120. The functions may be mathematical functions, involve one or possible more mathematical operations, or operate on data in any way. The functions may be broken into sub-functions in some examples. In examples, some of the functions are executed by sending one or more queries to the data cluster 120. Queries are software elements constructed according to any suitable programming language with capability to be executed in distributed fashion. In examples, a query may be a read or write operation.

In other aspects, some of the functions are executed at the computation cluster 102 creating first results and others of the functions are executed at the data cluster 120 creating second results.

In examples, the first results and the second results are aggregated by the task driver. In other examples, the results of individual nodes within a data cluster may be aggregated by a resource manager or other software component at the data cluster. Aggregation may involve comparing results, averaging results, or combining results using some other mathematical operation. If the analytic is:

$$f(x)=f1*f2*f3*f4$$

where f1, f2, f3, and f4 are functions, then the aggregation may be the multiplication of the individual results of the functions form a final result.

Figure 2:
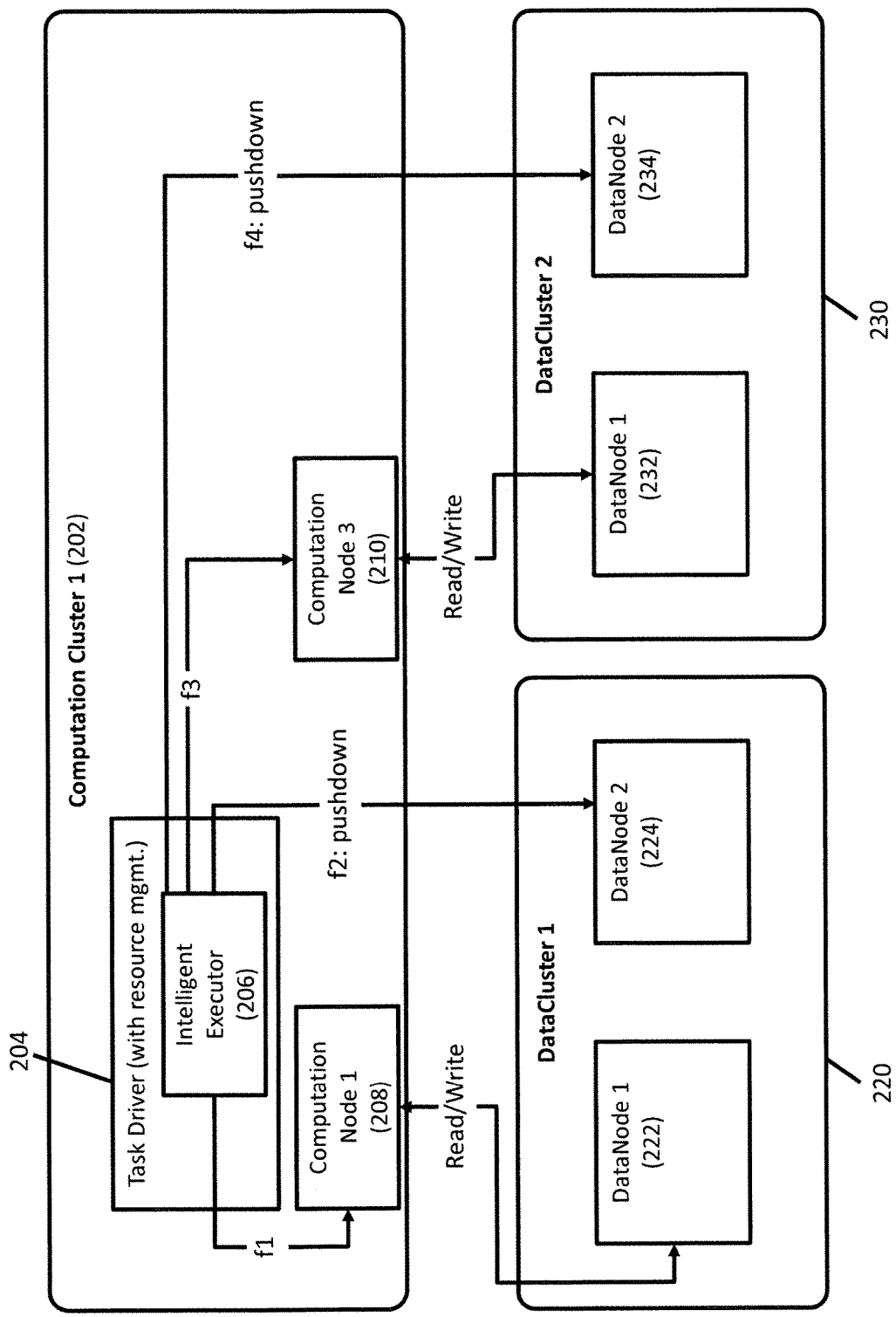
FIG. 2 comprises a block diagram showing the data and informational flow between a computation cluster and data clusters according to various embodiments of the present invention.

Referring now to FIG. 2, one example of the flow of information between computation clusters and data clusters is described. A computation cluster 202 includes a task driver 204 (with an intelligent executor 206), a first computation node 208, and a second computation node 210. A first data cluster 220 includes a first data node 222 and a second data node 224. A second data cluster 230 includes a third data node 232 and a fourth data node 234.

The task driver 204 may be any combination of hardware and/or software elements. The task driver 204 includes the intelligent executor 206. The intelligent executor 206 may also be any combination of hardware and/or software elements.

The first computation node 208, second computation node 210, first data node 222, second data node 224, third data node 232 and fourth data node 234 may include a processor (e.g., a microprocessor) and data stores. The data stores may store any type of data (e.g., time series data). Routers (not shown in FIG. 2) may also be deployed within the data clusters 220 and 230. The routers receive data from the computation cluster 202, and route data to appropriate data nodes within each of the data clusters 220, 230.

The task driver 204 implements an algorithm, which is the product of four functions:

$$f(x)=f1*f2*f3*f4$$

The functions f1, f2, f3, and f4 may be implemented as any combination of hardware or software. The functions f1, f2, f3, and f4 may be mathematical functions, involve mathematical operations, and may be dependent or utilize different features. Examples of features include machine learning predictive models, data down sampling and other aggregators. Other examples of features are possible.

In the example of FIG. 2, the functions f1 and f3 are executed at the computation nodes 208, 210. The functions f1 and f3 require data read/writes from/to multiple one of the data nodes 222, 224, 232, and 234. The functions f2 and f4 are executed at the data nodes 224 and 234, respectively. In aspects, function f4 is an aggregator function that aggregates or composes the results from functions f1, f2, or f3 and may execute on any of the nodes (but, in this example, executes at the data node 234).

The intelligent executor 206 executes an optimization algorithm and determines the best execution plan for a given analytic. There are two possible execution plans for a given function. First, it may be determined to execute the function at the computation node by fetching all required data from a remotely-located data node (or write the results of a computation to a data node).

Alternatively, it may be determined to push-down the execution of the function from the computation nodes to the data nodes and have the intelligent executor 206 read the results of the pushed-down execution. This later approach uses data locality to achieve enhanced performance and efficiency, and also leverages feature availability at the data nodes. All output from the execution at the computation nodes and from pushed-down execution at the data nodes is finally aggregated at the intelligent executor 206 at the task driver 204.

Figure 3:
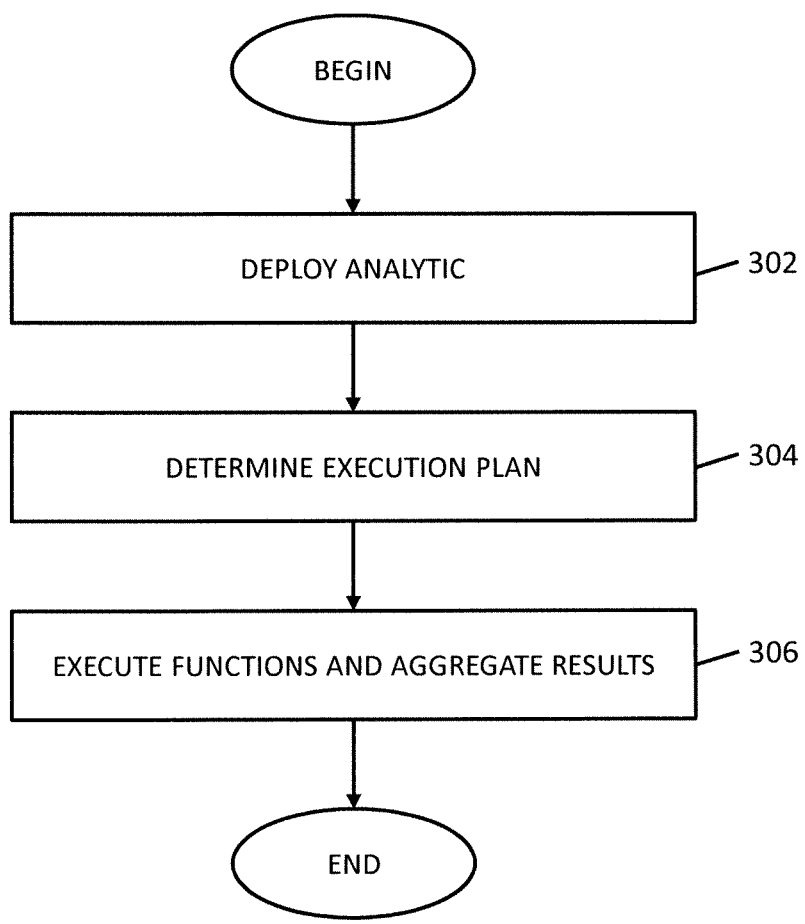
FIG. 3 comprises a flowchart of an approach that intelligently executes analytic functions at different locations according to various embodiments of the present invention.

Referring now to FIG. 3, an approach that intelligently executes analytic functions at different locations is described. In the example of FIG. 3, portions of the analytic are executed at a computation cluster that includes at least one computational node and a task driver, and a data cluster that includes at least one data node. The computation cluster is remotely located from the data cluster. By remotely located, in some aspects it is meant that the two clusters operate at different physical locations, use different processors, need to communicate via a network through various system or network elements (e.g., gateways, servers). In still other aspects, the computational node and the data node include a processor.

At step 302, an analytic is deployed at the task driver, and the analytic performs one or more functions. The functions may involve mathematical operations and may utilize software features such like Operations Optimization analytics for industrial revenue optimization, equipment performance optimization based on large to massive industrial IoT data At step 304, at the task driver, an execution plan for the analytic is determined based at least in part upon an analysis of the functions. The execution plan determines a location for execution of each of the functions, and the location is one of the computational node or the data node. The execution plan is a best effort to find an optimum execution plan for the functions.

At step 306, the functions are executed according to the execution plan. In examples, some of the functions are executed by sending one or more queries to the data cluster. In other aspects, some of the functions are executed at the computation node creating first results and others of the functions are executed at the data node creating second results. In still other examples, the first results and the second results are aggregated at the computation cluster.

Figure 4:
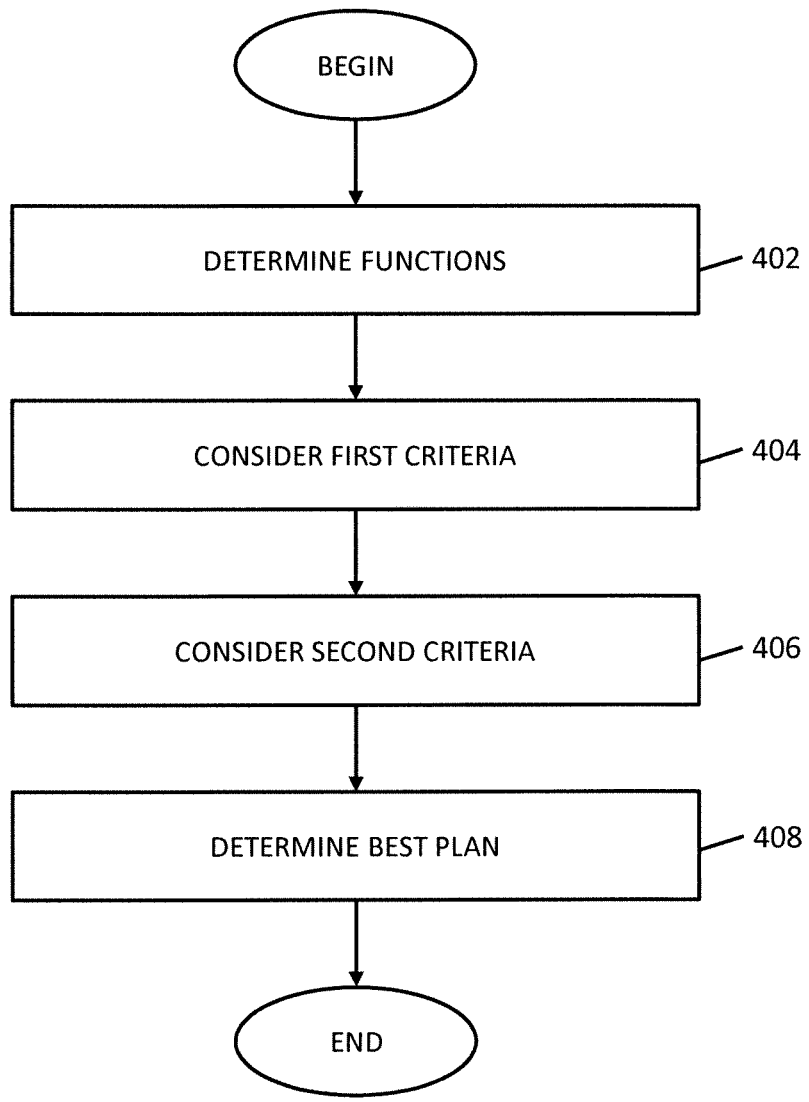
FIG. 4 comprises a flow chart of one example of an approach for determining a best plan to execute analytics according to various embodiments of the present invention.

Referring now to FIG. 4, one example of an approach for determining an optimum execution plan for functions in an analytic is described. It will be appreciated that the example of FIG. 4 is one example only and that other approaches are possible.

At step 402, the analysis of the analytic begins by determining the functions needed. In the example of FIG. 2, the analytic implements an algorithm, which is the product of four functions:

$$f(x)=f1*f2*f3*f4$$

Consequently, the four functions f1, f2, f3, and f4 are identified at step 402. The identification may be made manually by a user entering information into the system by an appropriate interface, or may be automatically done by an automatic analysis of the analytic.

At step 404, the amount of data needed to execute each function is located along with the source of this data. In this example, f1 requires small amounts of data available on a first data cluster. The function f2 requires large amounts of data from the first data cluster. The function f3 requires small amounts of data from a second data cluster. The function f4 requires large amounts of data from the second data cluster.

At step 406, an analysis is performed of the availability of features for functions at various locations. The functions require or perform when software features are available locally. In this example, the functions f2 and f4 require features that are available at the first data cluster and the second data cluster. The functions f1 and f3 do not require any special features and/or any features they do require are available at the computation cluster.

At step 408, the results of steps 404 and 406 are considered, and a best plan for executing the functions is produced or constructed. In aspects, the best plan determines where (data cluster or computation cluster) a function is to be executed based upon a set of predetermined criteria.

In this example, since the functions f2 and f4 use large amounts of data and require features, execution of these functions is selected to be pushed-down to data clusters. Pushing-down may involve downloading a copy of function (when the function is implemented as computer code) to a data node. Since the functions f1 and f3 do not require large amounts of data, and do not require features available at the data cluster, the functions f1 and f3 are selected to be executed at the computation cluster, and are not pushed-down to data clusters.

It will be appreciated that each of steps 406 and 408 involve selection criteria for where execution of a function will take place. Other examples of selection criteria are possible. Additionally, the various criteria can be weighted and the weighted criteria may be considered. For instance, the criteria of step 404 may be given a larger weighting factor (and considered more important) than the criteria specified by step 406.

It will be appreciated by those skilled in the art that modifications to the foregoing embodiments may be made in various aspects. Other variations clearly would also work, and are within the scope and spirit of the invention. It is deemed that the spirit and scope of that invention encompasses such modifications and alterations to the embodiments herein as would be apparent to one of ordinary skill in the art and familiar with the teachings of the present application.

What is claimed is:

1. A system that is configured to efficiently execute an analytic, the system comprising:
   a computation cluster that includes a computational node and a task driver;
   an analytic deployed at the task driver, the analytic performing an algorithm utilizing a first function and a second function, the first function and the second function performing a mathematical operation on data, performing a read operation or performing a write operation;
   a data cluster including a remotely-located data node, wherein the computation cluster is remotely located from the data cluster, wherein the physical location of the remotely-located data cluster is different from the physical location of the computational cluster;
   wherein the first function is different from the second function;
   wherein the task driver is configured to determine an execution plan for the algorithm of the analytic based upon an amount of data required by the first and second functions, the physical location of the data required by the first and second functions, and locations of programmatic features utilized by the first and second functions, the execution plan determining a location for execution of the first and second functions;
   wherein the execution plan specifies that the first function is executed on the computational node by fetching data required by the first function from the remotely located data node or writing data produced by the first function to the remotely located data node; and
   wherein the execution plan specifies that the second function is executed at the remotely located data node to create a result, and the result is transmitted to the task driver at the computational node, wherein the first function is executed by fetching data required by the function from the remotely located data node or writing data produced by the function to the remotely located data node.

2. The system of claim 1, wherein the computational node includes one or more processors.

3. The system of claim 1, wherein the data node includes one or more processors.

4. The system of claim 1, wherein some of the functions are executed by sending one or more queries to the data cluster.

5. The system of claim 1, wherein the data cluster includes a router.

6. The system of claim 1, wherein a third function is executed at the computation node creating first results and a fourth function is executed at the data node creating second results.

7. The system of claim 6, wherein the first results and the second results are aggregated by the task driver.

8. A method for efficiently executing an analytic, portions of the analytic being executed at a computation cluster that includes a computational node and a task driver, and a data cluster that includes a data node, wherein the computation cluster is remotely located from the data cluster, wherein the physical location of the remotely-located data cluster is different from the physical location of the computational cluster, the method comprising:
   deploying an analytic at the task driver, the analytic performing an algorithm utilizing a first function and a second function, the first function and the second function performing a mathematical operation on data, performing a read operation or performing a write operation, wherein the first function is different from the second function;
   at the task driver, determining an execution plan for the algorithm of the analytic based upon an amount of data required by first and second functions, the physical location of the data required by the first and second functions, and locations of programmatic features utilized by the first and second functions, the execution plan determining a location for execution of the first and second functions;
   wherein the execution plan specifies that the first function is executed on the computational node by fetching data required by the first function from the remotely located data node or writing data produced by the first function to the remotely located data node; and
   wherein the execution plan specifies that the second function is executed at the remotely located data node to create a result, and the result is transmitted to the task driver at the computational node, wherein the first function is executed by fetching data required by the function from the remotely located data node or writing data produced by the function to the remotely located data node.

9. The method of claim 8, wherein the computational node includes one or more processors.

10. The method of claim 8, wherein the data node includes one or more processors.

11. The method of claim 8, wherein executing the functions comprises executing at least some of the functions by sending one or more queries to the data cluster.

12. The method of claim 8, wherein the data cluster includes a router.

13. The method of claim 8, wherein a third function is executed at the computation node creating first results and a fourth function is executed at the data node creating second results.

14. The method of claim 13, further comprising aggregating the first results and the second results at the task driver.

* * * * *